United States Patent [19]

Meli et al.

[11] Patent Number: 5,347,792
[45] Date of Patent: Sep. 20, 1994

[54] METHOD AND APPARATUS FOR FORMING A SLICE OF A FOOD ITEM HAVING A HEAT TACK SEAL

[75] Inventors: Vincent A. Meli; David L. Shaft, both of Green Bay, Wis.

[73] Assignee: Schreiber Foods, Inc., Green Bay, Wis.

[21] Appl. No.: 114,981

[22] Filed: Aug. 31, 1993

Related U.S. Application Data

[63] Continuation of Ser. No. 843,503, Feb. 28, 1992, abandoned.

[51] Int. Cl.⁵ .................. B65B 9/12; B65B 51/30; B65B 51/16

[52] U.S. Cl. ................... 53/450; 53/479; 53/550; 53/371.4; 53/371.5; 53/374.3; 53/374.4; 99/453; 426/130; 426/410; 426/414

[58] Field of Search ............. 53/479, 450, 451, 567, 53/550, 553, 371.4, 371.5, 435, 374.3, 374.4; 426/130, 410, 414; 99/453; 156/164, 308.4, 309.9, 583.1, 583.4

[56] References Cited

U.S. PATENT DOCUMENTS

| | | |
|---|---|---|
| 1,546,963 | 2/1922 | Biernbaum . |
| 2,133,348 | 10/1938 | Ferenci . |
| 2,134,862 | 11/1938 | Dunnam . |
| 2,156,466 | 5/1939 | Vogt . |
| 2,160,367 | 5/1939 | Maxfield . |
| 2,460,460 | 2/1949 | Langer . |
| 2,505,603 | 4/1950 | Brandenberger . |
| 2,529,732 | 11/1950 | Howard . |
| 2,613,488 | 10/1952 | Attride . |
| 2,759,308 | 8/1956 | Nawrocki . |
| 3,001,348 | 9/1961 | Rado . |
| 3,140,572 | 7/1964 | Petersen et al. . |
| 3,182,430 | 5/1965 | Hoeppner . |
| 3,202,302 | 8/1965 | Insolio . |
| 3,237,367 | 3/1966 | Fievet . |
| 3,300,944 | 1/1967 | Thesing . |
| 3,325,961 | 6/1967 | Lindh et al. . |
| 3,378,988 | 4/1968 | McClosky . |
| 3,388,525 | 6/1968 | Thesing et al. . |
| 3,395,915 | 8/1968 | Clausen et al. . |
| 3,405,861 | 10/1968 | Bush ................. 426/130 X |
| 3,436,927 | 4/1969 | Gruber . |
| 3,469,363 | 9/1969 | Berckmoes . |
| 3,498,019 | 3/1970 | Rait ................. 53/450 |
| 3,532,516 | 10/1970 | Erekson ............. 53/450 |
| 3,542,570 | 11/1970 | Bush et al. ......... 53/451 X |
| 3,544,340 | 12/1970 | Miller et al. . |
| 3,592,329 | 7/1971 | Fleischauer . |
| 3,598,615 | 8/1971 | Chamberlain . |
| 3,623,653 | 11/1971 | Work ................ 426/130 X |

(List continued on next page.)

FOREIGN PATENT DOCUMENTS

| | | |
|---|---|---|
| 0138044 | 5/1992 | European Pat. Off. . |
| 1027024 | 3/1958 | Fed. Rep. of Germany . |
| 1146431 | 3/1963 | Fed. Rep. of Germany . |
| 1124865 | 3/1964 | Fed. Rep. of Germany . |

(List continued on next page.)

OTHER PUBLICATIONS

Pending application: Serial No. 07/791,490; Country: U.S.A.; Inventor: Meli et al.; Filing Date. Nov. 12, 1991.

*Primary Examiner*—Horace M. Culver
*Attorney, Agent, or Firm*—Willian Brinks Hofer Gilson & Lione

[57] ABSTRACT

An apparatus and method are provided for forming a package with heat tack seals for a slice of a food item. A web of thermoplastic material is first formed into a tubular arrangement with a longitudinal heat tack seal. To form the tubular arrangement, means are provided for folding a continuous web of thermoplastic material into a tube and for continuously forming a heat seal along the longitudinal face of the folded web. The food item which has been formed into a soft mass, is then inserted into the tubular member and the tubular member is flattened to form a thin film tube. Means are provided for forming a heat tack cross-seal which is disposed substantially transverse to the longitudinal forward moving direction of the web.

38 Claims, 8 Drawing Sheets

U.S. PATENT DOCUMENTS

| | | | |
|---|---|---|---|
| 3,623,891 | 11/1971 | Coffey | 426/130 |
| 3,634,099 | 1/1972 | Wilson . | |
| 3,688,468 | 9/1972 | Erekson . | |
| 3,693,319 | 9/1972 | Hunsader . | |
| 3,838,549 | 10/1974 | Pepmeier . | |
| 3,848,757 | 11/1974 | Jordan . | |
| 3,851,068 | 11/1974 | Kraft | 426/130 |
| 3,913,299 | 10/1975 | Stenstrom . | |
| 3,924,051 | 12/1975 | Wiggins et al. . | |
| 3,930,350 | 1/1976 | Reid . | |
| 4,015,021 | 3/1977 | Harmia et al. | 53/450 X |
| 4,074,504 | 2/1978 | Greenawalt et al. . | |
| 4,106,245 | 8/1978 | Aterianus . | |
| 4,139,978 | 2/1979 | Jensen et al. . | |
| 4,183,964 | 1/1980 | Vinokur | 53/450 X |
| 4,199,919 | 4/1980 | Moscatelli . | |
| 4,205,504 | 6/1980 | Gregoire et al. . | |
| 4,262,473 | 4/1981 | Brooke | 53/450 |
| 4,299,075 | 11/1981 | Gram . | |
| 4,426,401 | 12/1981 | Ottow et al. . | |
| 4,437,853 | 3/1984 | Metz . | |
| 4,467,589 | 8/1984 | van Maanen . | |
| 4,506,494 | 3/1985 | Shimoyama et al. . | |
| 4,524,567 | 6/1985 | Patelli . | |
| 4,530,632 | 7/1985 | Sela . | |
| 4,543,769 | 10/1985 | Schmitz . | |
| 4,586,317 | 5/1986 | Bussell | 53/479 X |
| 4,599,850 | 7/1986 | Kopp . | |
| 4,620,826 | 11/1986 | Rubio et al. . | |
| 4,630,426 | 12/1986 | Gentry . | |
| 4,637,199 | 1/1987 | Steck et al. . | |
| 4,712,357 | 12/1987 | Crawford et al. . | |
| 4,745,731 | 5/1988 | Talbott et al. . | |
| 4,759,170 | 7/1988 | Sawa et al. . | |
| 4,792,457 | 12/1988 | Brna et al. . | |
| 4,807,426 | 2/1989 | Smith | 53/550 |
| 4,876,842 | 10/1989 | Ausnit . | |
| 4,907,393 | 3/1990 | Omori et al. . | |
| 4,947,623 | 8/1990 | Saito et al. . | |
| 4,949,846 | 8/1990 | Lakey | 53/450 X |
| 5,053,239 | 10/1991 | Vanhatalo et al. | 53/450 X |
| 5,056,295 | 10/1991 | Williams . | |
| 5,112,632 | 5/1992 | Meli et al. | 53/451 X |

FOREIGN PATENT DOCUMENTS

| | | |
|---|---|---|
| 35551 | 11/1965 | Fed. Rep. of Germany . |
| 1586328 | 1/1971 | Fed. Rep. of Germany . |
| 3439680 | 5/1985 | Fed. Rep. of Germany . |
| 3841056 | 12/1987 | Fed. Rep. of Germany . |
| 3841945 | 7/1989 | Fed. Rep. of Germany . |
| 94157 | 9/1956 | Norway . |
| WO91/02461 | 3/1991 | PCT Int'l Appl. . |
| 587751 | 5/1977 | Switzerland . |
| 709966 | 6/1954 | United Kingdom . |
| 1004097 | 9/1965 | United Kingdom . |
| 1366798 | 9/1974 | United Kingdom . |

METHOD AND APPARATUS FOR FORMING A SLICE OF A FOOD ITEM HAVING A HEAT TACK SEAL

This application is a continuation of application Ser. No. 07/843,503, filed Feb. 28, 1992 and now abandoned.

BACKGROUND OF THE INVENTION

The present invention relates generally to an apparatus and method for packaging food items and more particularly to an apparatus and process for packaging and stacking food items in individual slices having heat tack seals.

Various methods and apparatus have been proposed and utilized for the manufacture and packaging of individual slices of food items such as cheese. Although the available apparatus and methods are suitable for the packaging of individual slices, they are not without disadvantages.

One distinct apparatus and method is disclosed in U.S. application Ser. No. 07/791,490, filed on Nov. 12, 1991, whose disclosure is incorporated herein by reference. In Ser. No. 07/791,490 the package for the individual slices is formed from a continuous film or web of a thermoplastic material. The web is first folded in V-folded condition. As used herein, the term V-folded condition refers to a length of material which has been folded over onto itself so as to form what may subsequently be identified as a front sheet and a rear sheet which are Joined by the fold at the bottom, so as to approximate the letter "V" in cross section. The web is typically folded such that the rear sheet is longer than the front sheet to define a flap section in the rear sheet, which extends beyond the top edge of the front sheet. The flap section is typically folded over onto the front sheet to form a tubular web.

For purposes of an example, the following description is given with processed cheese as the food item being wrapped. It will be appreciated that other items are within the scope of the invention. The food item, such as processed cheese, is inserted into the tube. The web and cheese are then flattened. Subsequently, cross-seals are formed transverse to the longitudinal length of the tubular web at predetermined intervals thus forming slices which are joined together. After the tube is cross-sealed it is severed along the cross-seals in order to produce individually wrapped slices of cheese.

Several processes presently exist for providing the cross-seal. In one commonly used method, the transverse cross-seals are formed by subjecting the flattened web (with the inserted hot cheese) to pressure, at the desired locations. The pressure is applied such that an ultra-thin layer or film of cheese is left in the transverse sealing section. The ultra-thin layer or film of cheese acts as an adhesive to hold the two layers of the plastic web together. After this "cheese seal" has been formed, the web is severed at the sealed sections to define individual slices of cheese.

Although the "cheese seal" provides an adequate seal for the individual slices of cheese, the shelf life of the cheese product after it is packaged is not as long as would be desirable. This is due to the face that the cheese seal is a relatively weak seal which will eventually deteriorate and which allows air to enter into the slices under ordinary atmospheric conditions. The slices thus will soon dry out or spoil, particularly near the edges where the "cheese seal" is formed.

Other methods of providing a transverse cross-seal have also been disclosed. For example, U.S. Pat. No. 4,586,317 (Bussell), whose disclosure is incorporated herein by reference, discloses an arrangement for forming a seal in packaging material (such as processed cheese) which utilizes a sealing element having a finite number of small channels in the surface. The packaging film is co-extruded or laminated to include an inner sealing layer of relatively low thermal plastic melt temperature and an outer layer which does not melt under sealing conditions. The tube is heated and compressed transversely by the sealing elements thereby sealing the internal layers of the packaging film together. Such a sealing method is also employed in the arrangement disclosed in WO 91/02461 (Davison et al.) whose disclosure is incorporated herein by reference. Although the apparatus and method disclosed in this patent provide a suitable cross-seal, the finished product suffers from the same disadvantages that are described above. Since the longitudinal seal is formed by providing a flap in the V-folded condition web and simply overlapping the flap with the upper surface of the front sheet of the web, a poor seal is formed. Thus, air and other atmospheric products will enter into the wrapped slices of cheese, reducing the shelf life of the product.

Another sealing device is available from Kustner Industries S.A. The Kustner device employs two pairs of opposing rotating cylinders wherein at least one of the opposing cylinders has heated cleats attached thereto. Seals are formed by having a flattened cheese product tube having hot cheese therein move through one of the pair of opposed cylinders and being pressed by the heated cleats on the opposed cylinders. The heated cleats are aligned where the tube passes through the opposed cylinders. The tube is then conveyed to another pair of opposed cylinders having heated cleats and the process is repeated so as to form seals where the tube is pressed. It should be noted that the Kustner device only heats the seals when the cleats make contact with the seals and the dwell time of the seal on the cleats is approximately 0.01 seconds.

One solution to the problems present in the prior art is disclosed in U.S. application Ser. No. 07/791,490, whose disclosure is incorporated herein by reference. Ser. No. 07/791,490 teaches to provide an individual slice of cheese which is wrapped in a package which is hermetically sealed on all sides. To accomplish this, a hermetic seal is formed along the longitudinal edge of the web as well as along the transverse cross-seals. A hermetically sealed package would have several advantages. For example, a hermetically sealed slice would permit immersion for cooling and sanitizing. Further, a hermetically sealed slice is essential to aseptic packaging.

Despite the advantages of using hermetically sealed slices, the present invention provides other advantages. For example, the hermetically sealed slices are harder to open than other seals and a hermetic seal may not always be necessary.

Therefore, in view of the above, it is an object of the present invention to provide an apparatus and a method for producing individual slices of food items, such as processed cheese, which avoid the disadvantages of a "cheese seal" and provide an alternative to hermetically sealed packaging. In other words, the present invention involves producing a sealed packaged slice having the positive attributes of a "cheese seal" (i.e. easy to open and inexpensive) and a hermetically sealed slice (i.e- strong bond and long preserving time).

It is a further object of the present invention to provide an apparatus and method for providing a continuous and efficient arrangement for forming a longitudinal heat seal along the face of the folded packaging web.

It is a further object of the present invention to provide an apparatus which can form heat seals in an inexpensive manner by allowing present packaging devices, such as hot-fill machines, to be retrofitted with a crimp/sealing station which produces heat seals which are better than "cheese seals".

SUMMARY OF THE INVENTION

To achieve the foregoing and other objects and in accordance with the purposes of the present invention, an apparatus and method are provided for forming a package having a heat seal used for a slice of a food item. The seal formed will form an actual seal between the layers of the thermoplastic wrapping material but not to the extent of forming a hermetic seal. This seal will be hereinafter referred to as a "tack seal". To form a slice with such a seal, a web of thermoplastic material is first formed into a tubular arrangement with a longitudinal heat seal. The food items such as cheese, which has been formed into a soft mass, is then inserted into the tubular member and the tubular member is flattened to form a continuous web. Means are then provided after the web is cooled for forming heat tack cross-seals which are disposed substantially transverse to the longitudinal forward moving direction of the web. The means for forming the heat tack cross-seals includes a registration station to apply pressure to form registration lines to define the slices, a heating station to receive the defined slices from the registration station and heat the slice and registration lines at a predetermined temperature for a predetermined time, and a sealing station to receive the slices from the heating station and apply pressure to the heated registration lines to form a heat tack seal at the registration lines.

Additional objects, advantages and novel features of the invention will be set forth in part in the description which follows, and in part will become apparent to those skilled in the art upon examination of the following or may be learned by practice of the invention. The objects and advantages of the invention may be obtained by means of the combinations particularly pointed out in the appended claims.

DESCRIPTION OF THE PRESENTLY PREFERRED EMBODIMENT

Figure 1:
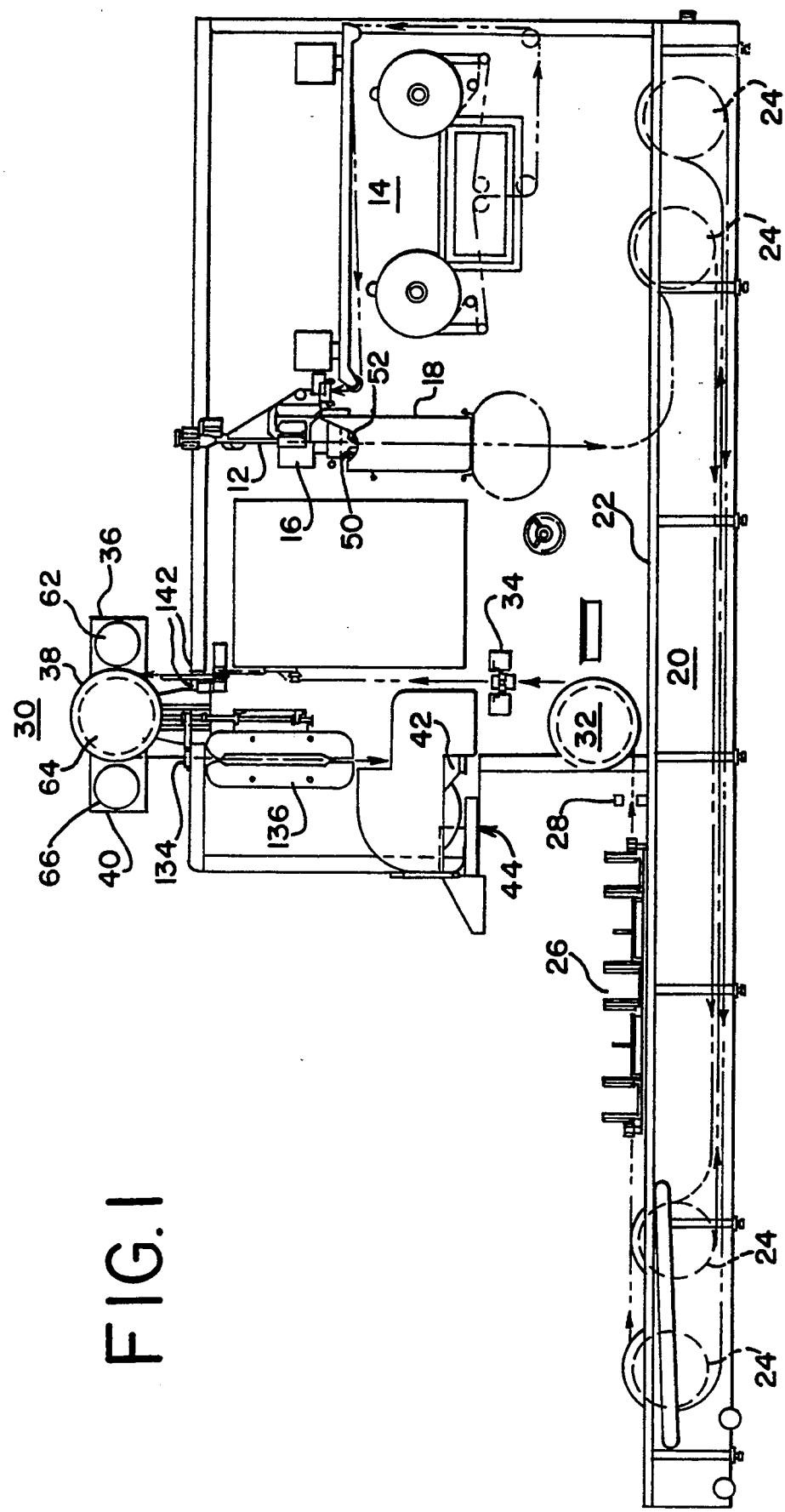
FIG. 1 is a schematic view of one embodiment of the present invention.

Reference will now be made to the drawings wherein like elements are referred to with like reference numerals throughout the various drawings. Referring specifically to FIG. 1, a preferred embodiment of the arrangement and process of the present invention including the registration, heating, and sealing stations is illustrated.

Cheese is first processed, in a manner known in the art, by cheese processing means 10. The processed cheese is then transferred, in a known manner, from the cheese processing means 10 into a fill tube arrangement 12 which is used to insert the processed cheese into a tubular web made of thermoplastic material, preferably polypropylene.

Figure 10:
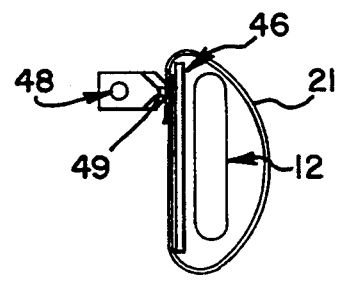
FIG. 10 is a top view of the longitudinal sealing station of the embodiment of FIG. 1.

In more detail, the tubular web of thermoplastic material is formed by providing a continuous film or web of thermoplastic material from a film supply assembly 14 which is well known in the art and folding the web into a tubular configuration 21 where a first longitudinal edge of the web partially overlaps a second longitudinal edge of the web as shown in FIG. 10. The flap portion may be folded over onto the front face of the web in a manner known in the art. After the web of thermoplastic material has been folded into the partially overlapping tubular condition, a longitudinal seal is formed at a longitudinal sealing station 16 (in a manner described in more detail below). As seen in FIG. 10 the seal is formed away from the edge of the first longitudinal edge such that a flap portion is defined. In an exemplary embodiment, the seal is located approximately 1.5" from the edge of the first longitudinal edge. After the longitudinal seal is formed at the longitudinal sealing station 16, heated cheese is inserted by means of the fill tube 12 into the tubular web. The web and cheese are then passed to a flattening station 18 (also described in more detail below). At the flattening station 18, the tubular web with the cheese is flattened to form a continuous web or long slice of wrapped cheese.

After the web has been flattened and formed into the long slice, the web is then passed through a cooling station 20. The cooling station 20 cools the surface of the web. In one preferred embodiment, the cooling station 20 comprises a tank or container 22 for holding a cooling liquid, such as tap or cooled water. The liquid is such that it preferably provides cooling and lubrication to the web. In this embodiment, the cooling station 20 may include two pair of rollers 24 such that the web and cheese are passed through the tank in a winding fashion. Preferably the cooling station 20 is configured such that the web with the cheese passes through the cooling water for approximately 60 seconds with the water being at approximately 36° F. This will take the cheese which initially starts off at the fill tube at a temperature of between 160° F. and 185° F. (normally 180° F. but envisioned to be as low as 130° F.) and cool the cheese down to approximately 50° to 60° F. at the exiting end of the cooling station 20. The cooling station may also include scrapers 26 and/or air-blowers 28 to dry the web as it exits from the cooling station 20. It will be recognized by those skilled in the art that other suitable cooling means may also be used.

After leaving the cooling station 20 and proceeding through scrapers 26 and air-blower 28, the web is conveyed to the crimp/sealing device 30 which forms the heat tack cross-seals. A transverse heat stress gauge 32 may be provided after the air-blower 28 to sense the tension of the web. The tension that is sensed is then used to adjust the speed of the web so as to eliminate any undesirable slack in the web. From the stress gauge 32 the web may be further dried by air dryer 34 which provides compressed air to the web. After passing through the air dryer 34, the web is then in condition to enter the crimp/sealing station 30. The crimp/sealing station 30 includes a registration station 36, a heating station 38, and a sealing station 40 all three of which will be described in more detail below.

The crimp/sealing station 30 provides a heat tack seal transverse to the longitudinal or forward moving direction of the web. The web now includes a plurality of slices of cheese which are provided with a heat tack seal.

Cooling the web before the cross-seals are formed provides significant advantages over other available systems. In previous methods the web is cooled after the cross-seals are formed. This method results in the web shrinking and the size of the slices not being uniform. Thus, the previous method results in registration problems when the individual slices are cut and stacked. In direct contrast, the present invention cools the web before the cross-seals are formed. This pre-cooling step substantially eliminates any shrinkage in the web and leads to improved registration when individual slices are cut and stacked.

After the cross-seals have been formed, the web is then conveyed to a cutting station 42 to separate and stack the individual slices of cheese. The cutting station 42 includes means for cutting the web along the cross-seal to produce individually wrapped slices. The individually wrapped slices are preferably conveyed to a stacking station 44 which stacks the slices conveyed from the cutting station 42 into a plurality of stacks.

THE LONGITUDINAL SEALING STATION

Figure 9:
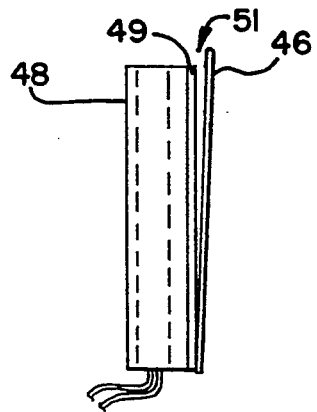
FIG. 9 is a side view of the longitudinal sealing station of the embodiment of FIG. 1.

The preferred embodiment of the longitudinal sealing station 16 provides a novel and advantageous apparatus and process for forming the longitudinal heat tack seal in the web without stopping the web in an intermittent fashion. The longitudinal sealing station 16 includes a stationary plate 46 and a stationary heater bar 48 shown in FIGS. 9 and 10. Plate 46 preferably is rectangular in shape and is located inside the partially overlapping tubular configuration. Preferably, heater bar 48 has a rectangular sealing edge 49 which is opposed to plate 46 and having a thickness of approximately ⅛".

In a preferred embodiment the plate 46 and heater bar 48 are disposed at an angle with respect to each other such that an entrance gap 51 nearest the fill tube 12 is formed and the gap between plate 46 and heater bar 48 decreases the further one is from the fill tube 12. When polypropylene is used as a web material the entrance gap 51 is preferably approximately 1/32" wide. The gap between plate 46 and heater bar 48 decreases to such an extent that contact is made between the plate 46 and heater bar 48 at their ends. This angled configuration for the plate 46 and heater bar 48 allows for the overlapping portion of the web to reside solely on the plate 46 in a support area located from the entrance gap 51 to a contact area located further downstream. At the contact area the overlapping portion of the web is in intimate contact with both the plate 46 and heater bar 48. In an exemplary embodiment, the wedge shaped plate presently has a vertical height of about 7" for speeds of about 300–700 slices per minute. The vertical height may be lengthened for higher speeds to increase the dwell time. For example, it is contemplated that for some production speeds to use a heater bar having a vertical height of approximately 10" with a support area having a vertical height of approximately 7" and a contact area having a vertical height of approximately 3".

The vertical height of the support area and the contact area is dependent on such factors as the machine speed and the type of film used to wrap the slice. Heat is provided for heating the heater bar 48 to a temperature sufficient to form a longitudinal heat tack seal as the web is conveyed between the plate 46 and heater bar 48. It is also contemplated that for higher production speeds, the plate 46 and heater bar 48 will be arranged such that the web will ride along the entire length of the plate 46 and plate 46 will have a contact area of approximately 6–8" at the bottom end of the heater bar 48.

The heating may be provided by any suitable heating means, for example, an electric heater which is inserted longitudinally through an aperture In the heater bar 48. A suitable heater is available as Model No. 28-232103-305 from Fenwall. Heater bar 48 is heated to a temperature sufficient to form a heat tack seal between the two sheets of the web, for example, heater bar 48 may be heated to a temperature of approximately 285° F. when polyropylene is used for the web material or approximately 350° F. when Mylar is used. It will be appreciated that the temperature of the heater bar 48 will be dependent on the time that the web dwells on the heater bar 48, i.e. the appropriate temperature will be dependent on how fast the web is moving.

The fill tube 12 extends down into the web such that the exiting edge of the fill tube 12 is disposed after the longitudinal seal has been formed and a tube has been defined.

In a preferred embodiment, a bubble control unit (not shown) is disposed before the flattening station 18. The bubble control unit functions to determine the amount of cheese which is being inserted into the web. In this manner, the flow of cheese may be controlled as appropriate for the speed of the web and the desired thickness and weight of the slice. After the cheese is inserted into the tubular web, the tubular web is conveyed to a flattening station 18. The flattening station 18 includes a first set of Juxtaposed rollers 50, a second set of Juxtaposed rollers 52, and a pair of opposed belts (not shown). Each belt is disposed around one set of rollers 50, 52. As the web, with the cheese inserted therein, passes between the two belts, the cheese is flattened to form a web comprising the tubular thermoplastic film and a continuous slice of cheese. Means are provided in the flattening station 18 for adjusting the distance between the belts to control the thickness of the web of tubular thermoplastic material and cheese. Preferably, the belts are loaded so as to ensure that the belts press firmly against the web when present therebetween or are positioned at a fixed distance from each other when no web material is present therebetween.

As described above, the web is formed into a tubular section with a longitudinal seal. Preferably, the web is sealed along the front face of the web such that a flap portion is defined.

After the longitudinal seal is formed, the web is conveyed through the cooling station 20, as described above, and then the flap is folded onto itself. The flap may be folded over in a manner known in the art before the web reaches the crimp/sealing station 30. Preferably, the flap is partially sealed at the cross-seal sections to the front face of the web at the crimp/sealing station 30 in a manner well-known in the art.

PRE-CRIMPING DEVICE

In order to maximize the uniformity of the thickness for the cheese slice (approximately ⅛" to 16"), a pre-crimping device 142 is preferably employed before the web enters the crimp/sealing device 30. In one embodiment shown in FIG. 11, the pre-crimping device 142 comprises two cylinders 144 having essentially the same dimensions as the registration cylinder 62. Instead of employing the rectangular-like cleats of the registration cylinder 62, each slice flattening cylinder 144 employs rounded cleats 146 made of silicone rubber or urethane. There are four rounded cleats arranged equidistantly from each other on each cylinder 144. Furthermore, the cleats on opposing cylinders will be aligned with each other at those positions in the web where the registration station 36 will form the registration lines. When the rounded cleats 146 on opposing cylinders are aligned they compress each other so that the web of cheese will be pressed when it passes between the cylinders 144. By pressing the web, the front ends 148 of the aligned rounded cleats 146 push part of the cheese away from the registration line into the leading slice and the rear ends 150 push some of the cheese into the trailing slice. Thus the bump is substantially eliminated.

Figure 11:
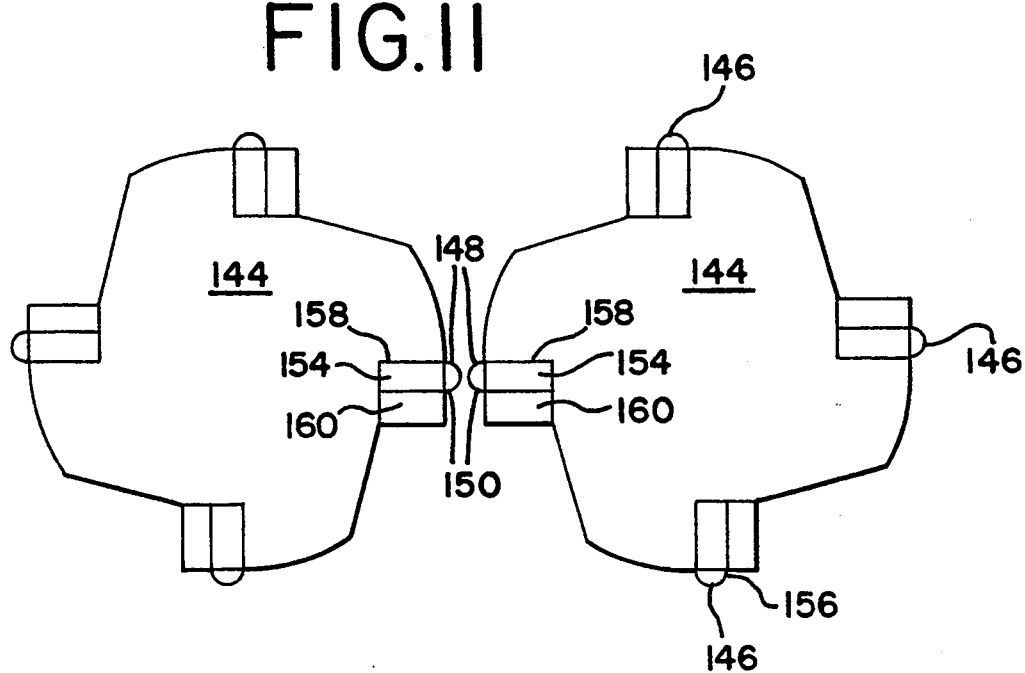
FIG. 11 is an embodiment of a slice flattening device.

In an exemplary embodiment, the rounded cleats 146 are located in a notched cylinder as shown in FIG. 11. Each cylinder 144 has a diameter of approximately 5.1", including opposed cleats 146 when they are not compressed. The cylinders 144 are positioned such that the distance between the centers of the cylinders 144 is approximately 4.9" during compression of the rounded cleats 146. Placed against two walls of each notch 152 is a support bar 154 which has a sheet of silicone rubber or urethane 156 wrapped around it so as to form the rounded cleats 146. The diameter of each cylinder 144 is approximately 4.0", including the support bars 154 and excluding the cleats 146. The sheet 156 ks held in place against wall 158 and a second bar 160. The cylinders 144 are preferably synchronized with the registration cylinder 62 by having the registration cylinder 62 and at least one of the slice flattening cylinders 144 connected by pulleys and driving belts An a manner well known in the art.

Figure 12:
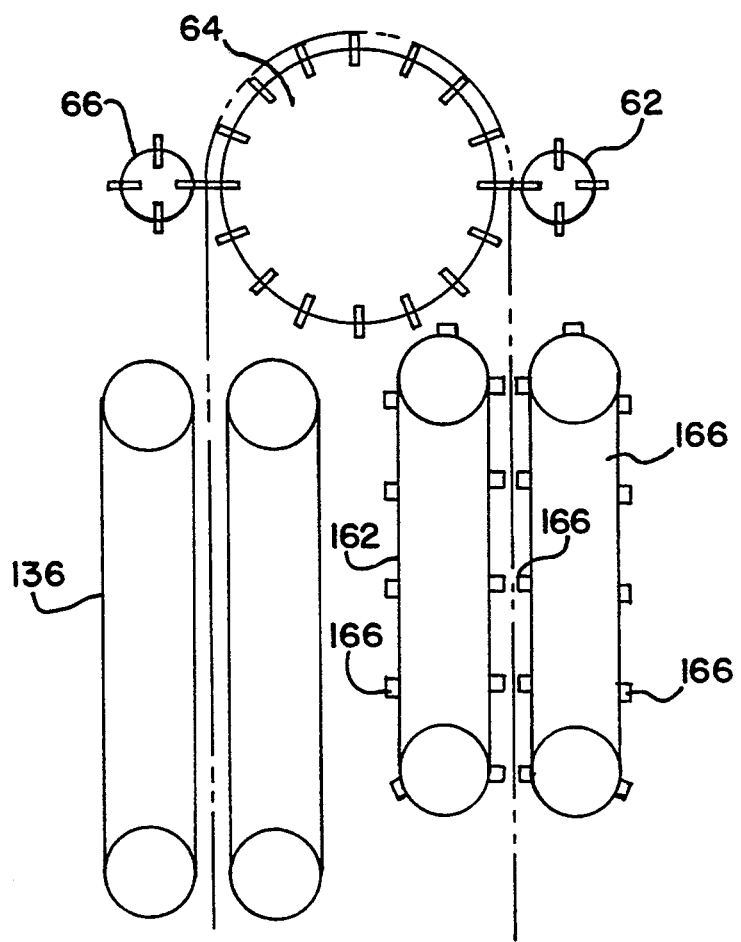
FIG. 12 is a second embodiment of a slice flattening device.

In another embodiment shown An FIG. 12, two rotating belts 162 may be used which contain flat cleats 166 which are aligned with each other in a manner similar to that described in the FIG. 11 embodiment. Cleats 166 may be made for example of urethane or a rubber-like material. The cleat 166 has a thickness which corresponds to approximately one half of the desired thickness of the cheese slice. The belts 162 are driven by cylinders 164 which are preferably synchronized with the registration cylinder 62 by having the registration cylinder 62 and at least one of the cylinders 164 connected by pulleys and driving belts in a manner well known in the art.

THE CRIMP/SEALING STATION

Figure 2:
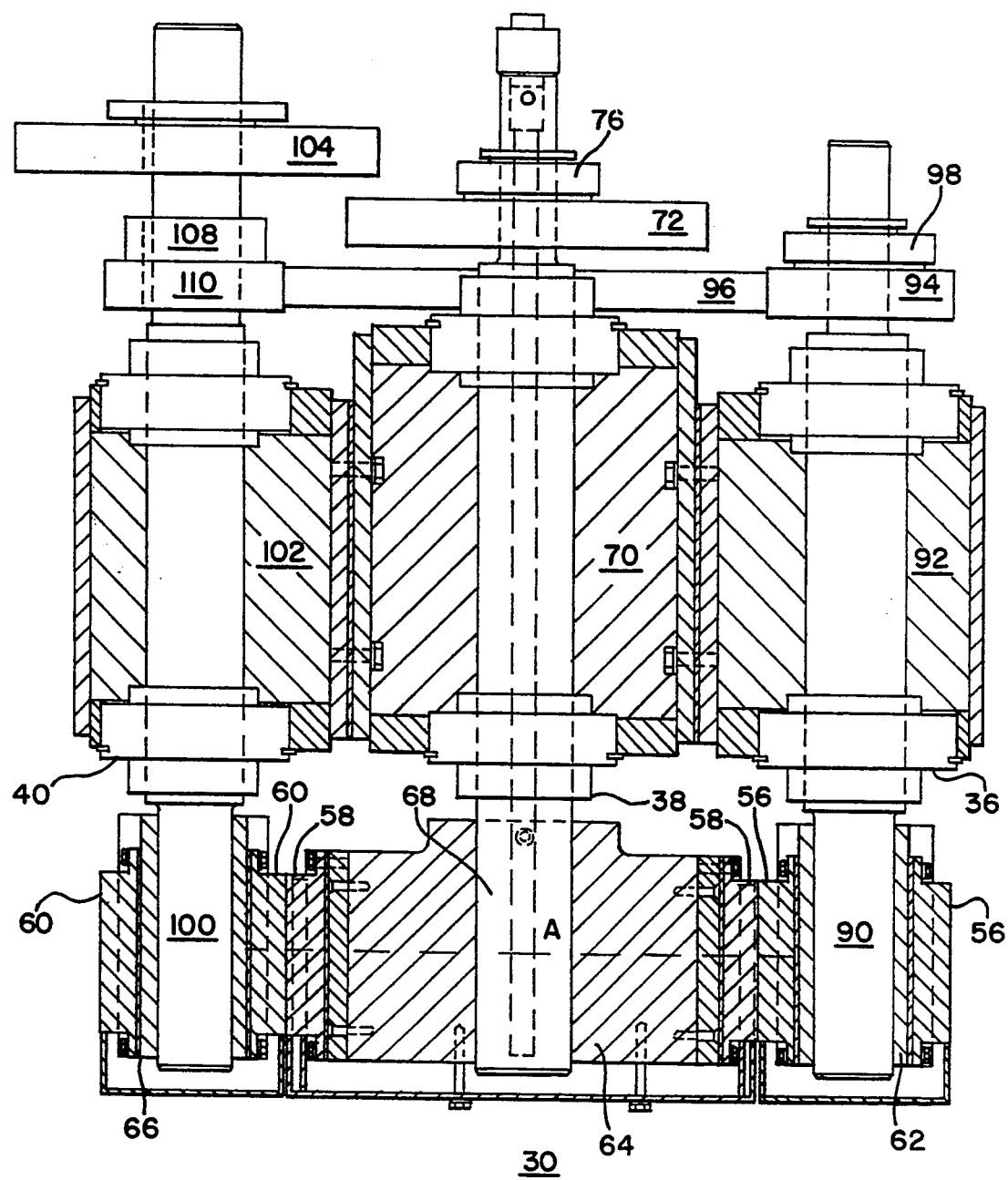
FIG. 2 is a top view of the crimp/sealing device of the embodiment of FIG. 1.
Figure 3:
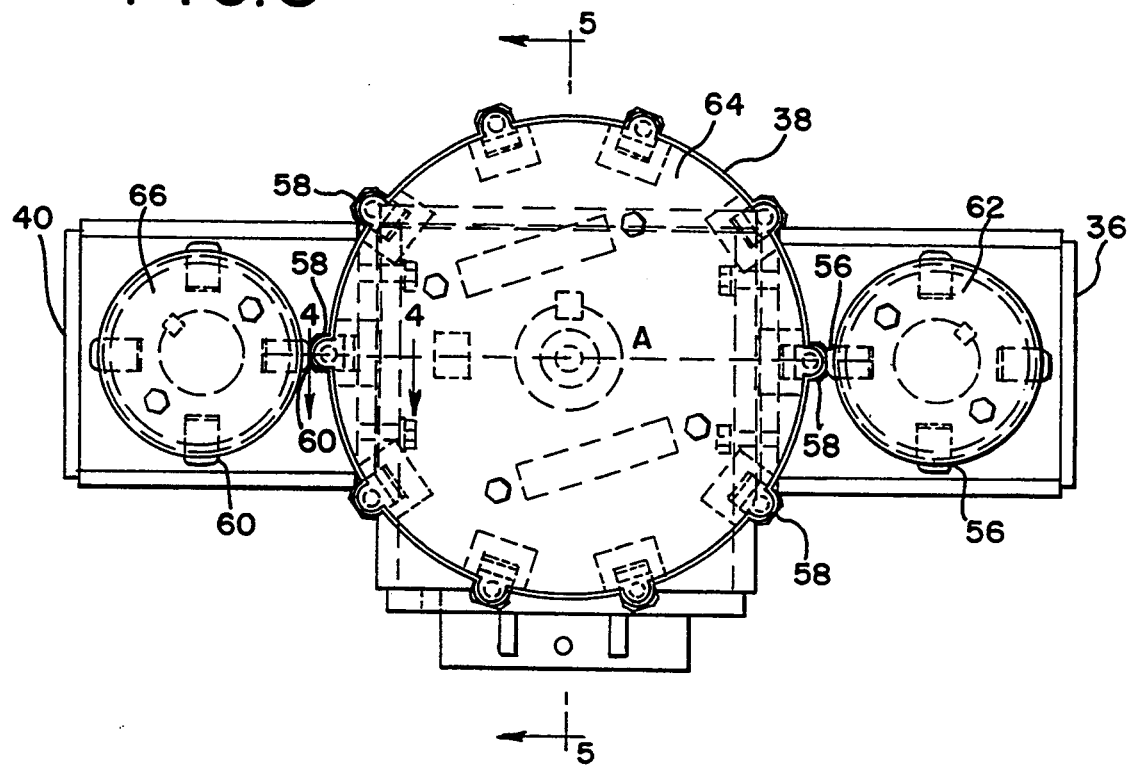
FIG. 3 is a front view of the crimp/sealing device of the embodiment of FIG. 1.

Referring now specifically to FIGS. 1–3, a preferred embodiment of the crimp/sealing device 30 is disclosed. The crimp/sealing device 30 includes a registration station 36, a heating station 38, and a sealing station 40, with each of the stations 36, 38, and 40 including a plurality of opposed Jaws or cleats 56, 58, and 60, respectively mounted on respective stations. The registration station 36 and heating station 38 arranged such that as the web is conveyed between the cleat 56 of the registration station 36 and the engaging cleat 58 of the heating station 38 the top and bottom layers of the film web are urged into intimate contact with each other at a plurality of cross-sealing zones while the web is continuously moved forward in the desired cross-sealing section. The cleats 56 and 58 provide sufficient pressure when they engage each other to remove substantially all of the cheese in the area of the web in contact with the cleats. Thus, both sides of the web make contact with each other at the engagement area of the cleats 56 and 58 forming a registration line. The cleats 58 of the heating station 38 are heated to the sealing temperature, in a manner known in the art. For example, the cleats 58 may be heated by embedding an electrical heater into each cleat. A suitable electric heater is Model No. G3P8-D10 available from Warlow. The electrical heaters in each cleat 58 may be commonly connected to a single power source. The heaters preferably produce 100 Watts of power but may produce as much as 150 Watts. Such heaters are designed to produce a temperature range from approximately ambient to 450° F. The cleats 58 may be made of any suitable material such as stainless steel.

The engaging cleat 56 of the registration station 36 preferably is made of a softer material than cleat 58. For example, the cleat 56 may be made of a metallic material such as aluminum with a surface made of a resilient material such as urethane. When urethane is used it preferably has a durometer hardness of 60.

Means are provided for urging the two opposed cleats 56 and 58 to engage the web of cheese as it is conveyed between the registration station 36 and heating station 38. As illustrated in the figures, in the preferred embodiment, the means for urging cleats 56 and 58 together comprises using cylindrical registration and heating stations whose axes are parallel to each other. In an exemplary embodiment, the registration cylinder 62 has a pitch diameter of approximately 4.9" to 4.91" including the cleats 56. There are preferably four cleats 56 equidistant from each other and located on the circumference of the registration cylinder 62. Each cleat 56 preferably has an annular thickness of approximately ¼" and a length of approximately 4".

Similarly, the heating cylinder 64 has a diameter of approximately 11¾" without the cleats 58 and a diameter of approximately 12¼" with the cleats 58 present. There are preferably ten cleats 58 equidistant from each other by a distance of approximately 3-13/16" and located on the circumference of the heating cylinder 64. Each cleat 58 preferably protrudes from the cylinder by approximately ¼" and has a length of approximately 4".

The registration cylinder 62 and the heating cylinder 64 each rotate about their respective axis by driving mechanism which is to be disclosed in more detail below. The locations of cleats 56 and 58 are arranged such that upon simultaneous rotation of the registration and heating cylinder's corresponding cleats 56 and 58 will This arrangement allows for high speed production of the individual slices of cheese. Since the heating cleats 58 and cleats 56 and 60 of the registration and sealing stations ride or move along with the cross-seal for a fixed period of time, the web may be continuously moved at a relatively fast pace providing a rapid production rate. For example, the web may be moved at approximately 200 feet/minute or such that over approximately 150 to 700 slices are produced per minute. Due to the predetermined dwell time of the web on the heated cleats 58 a good seal is formed for the slices.

HEATING STATION

Figure 5:
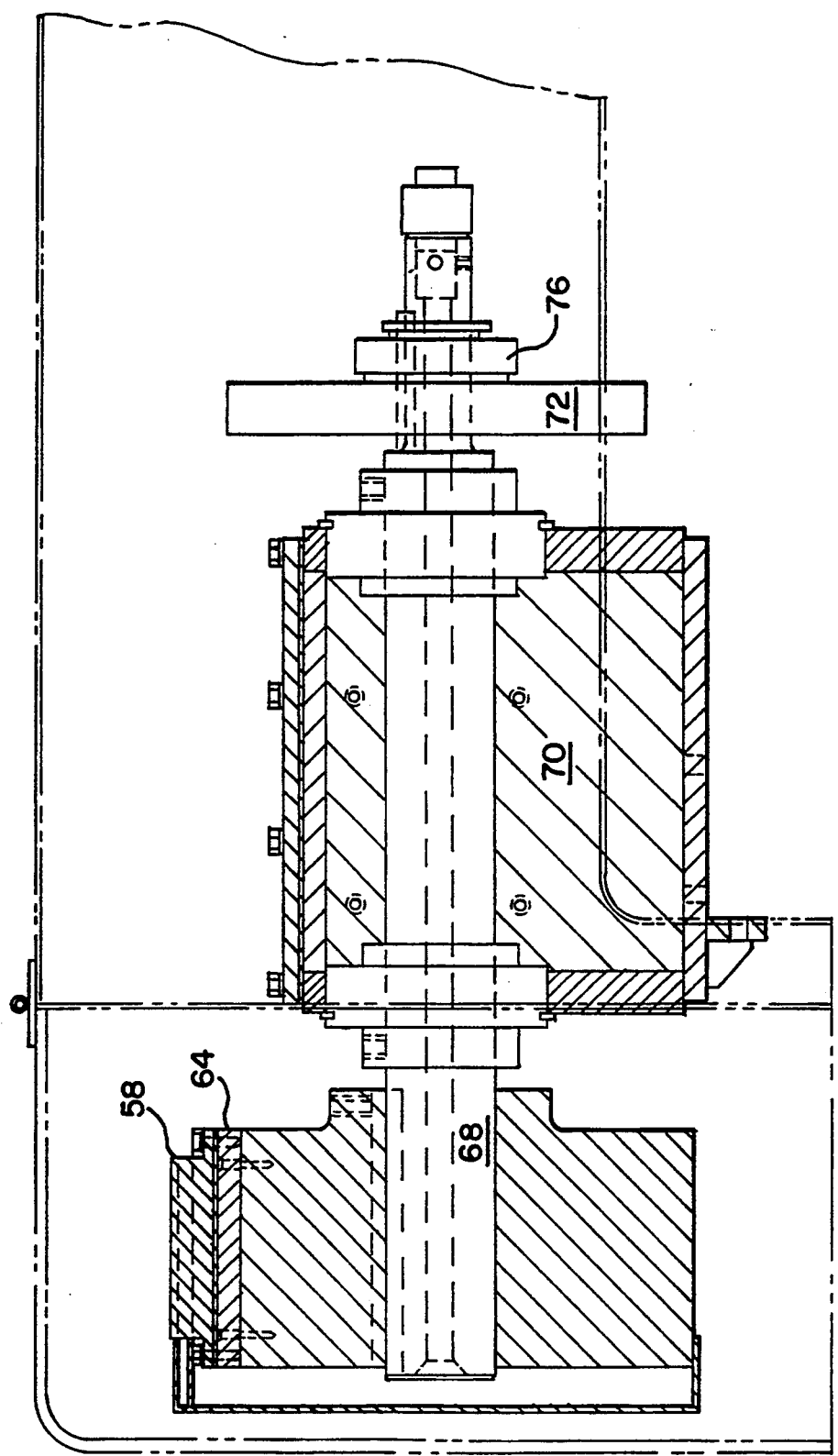
FIG. 5 is a top view of the heating station of the embodiment of FIG. 1.
Figure 7:
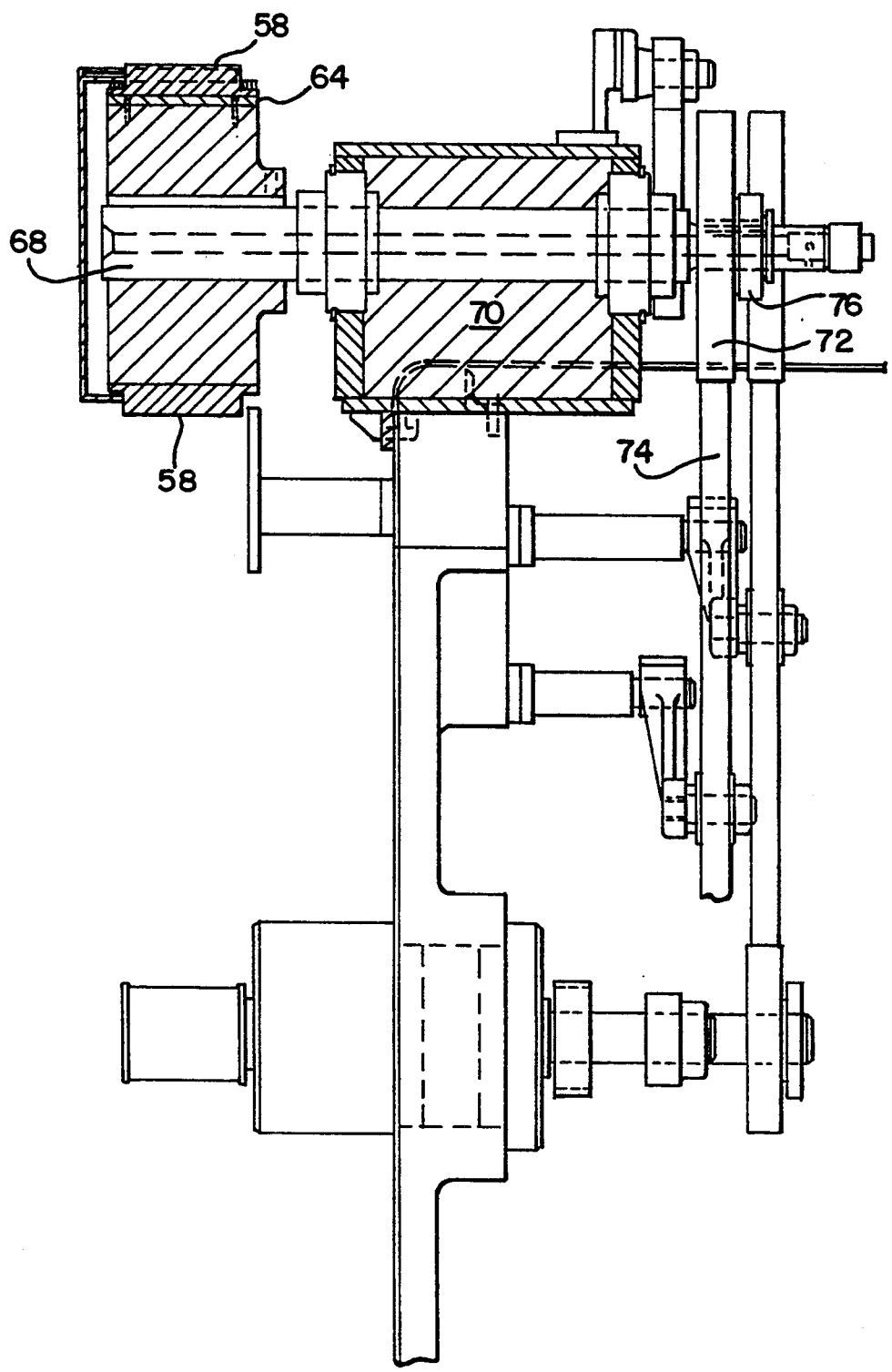
FIG. 7 is a side view of the driving assembly of the embodiment of FIG. 1.
Figure 8:
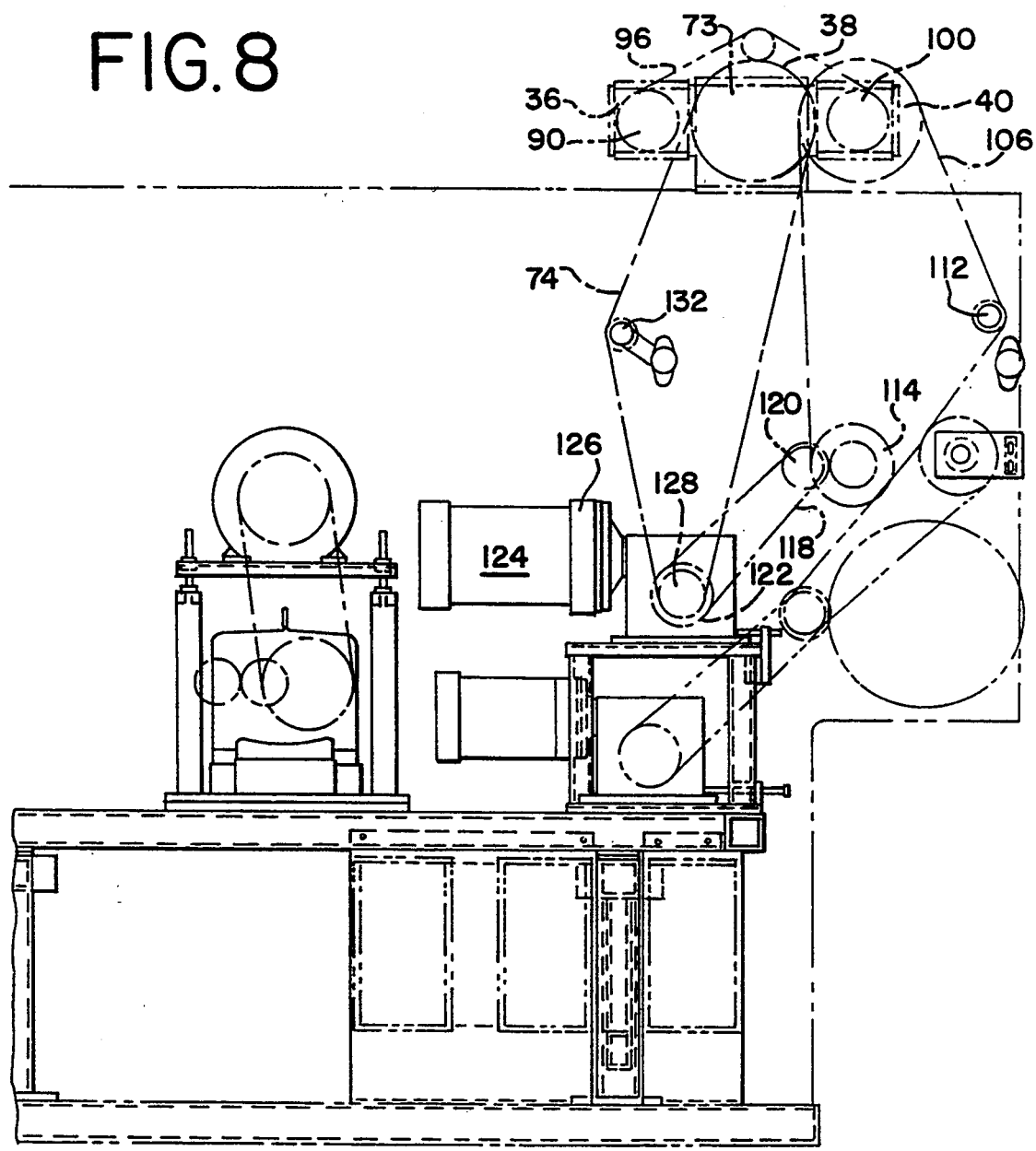
FIG. 8 is a rear view of the driving assembly of the embodiment of FIG. 1.

As seen in FIGS. 2, 5, and 7 the heating cylinder 64 is attached to a rotating shaft 68. Rotating shaft 68 is held in position by housing 70. Rotating shaft 68 extends from the heating cylinder 64 through housing 70 to a rear side where there is attached a pulley 72 to which a driving belt 74 is attached. The shaft 68 also includes a hub adjusting bushing 76 which adjusts the axial position of the heating shaft 68 and cylinder 64. As seen in FIGS. 7 and 8, the driving belt 74 rotates the heating shaft 68 and cylinder 64.

Figure 4:
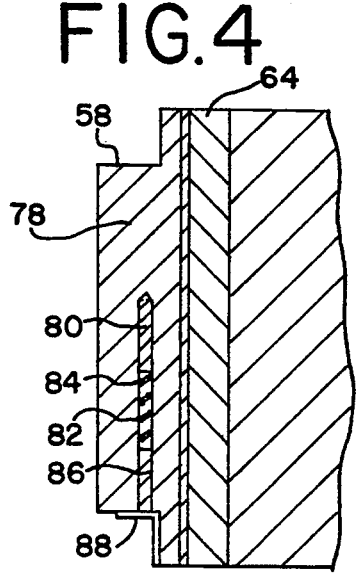
FIG. 4 is a side view of a cleat attached to the heating station of the embodiment of FIG. 1.

As described previously, there are preferably ten cleats 58 arranged on the surface of the heating cylinder 64. Each cleat 58 comprises a heating block 78 which is attached to the heating cylinder 64 by well known mechanical means such as bolts and screws as seen in FIG. 4. Each cleat 58 has an electric rod heater embedded in the heating block 78 to supply heat to the cleat 58. One of the cleats 58 also includes a temperature sensor 80 located in a channel 82 of the heating block 78. The temperature sensor 80 is held in position by a spring 84 in contact with a spacer 86. The entire sensor system is sealed inside the heating block by retainer 88. The temperature sensor 80 and electric wire are preferably coated with a generous amount of Dow Corning "Compound 7" silicone heat transferable grease prior to insertion into the heating block 78.

For purposes of quality control and to achieve uniformity in the cross-seals, one of the heated cleats 58 includes a central temperature control having a microprocessor to control the current the power supply supplies to each individual cleat 58. A temperature controller then adjusts the temperature in all of the cleats 58. In another embodiment, individual thermostats may be used to control the temperature of each individual cleat. In this embodiment the temperature of each cleat 58 can be individually controlled.

REGISTRATION AND SEALING STATIONS

As seen in FIG. 2, the registration cylinder 62 is attached to a rotating shaft 90. Rotating shaft 90 is held in position by housing 92. Rotating shaft 90 extends from the registration cylinder 62 through housing 92 to a rear side where there is attached a pulley 94 to which a driving belt 96 is attached. The shaft 90 also includes a hub adjusting bushing 98 which adjusts the axial position of the registration cylinder and shaft. As seen in FIG. 2, the driving belt 96 rotates the shaft 90 and the registration cylinder 62.

There are preferably four cleats 56 arranged on the surface of the registration cylinder 62. Each cleat 56 is attached to the registration cylinder 62 by well-known mechanical means such as bolts and screws.

The description of the preferred embodiment of the registration station 36 is applicable to the sealing station 40 since the registration and sealing cylinders are identical. Sealing cylinder 66 As attached to rotating shaft 100 which is supported by housing 102 in a manner similar to the registration shaft 90. A pulley 104 is attached to the shaft 100 so that a driving belt 106 will provide rotational motion. The axial position of the shaft 100 is adjusted by hub adjusting bushing 108.

Figure 6:
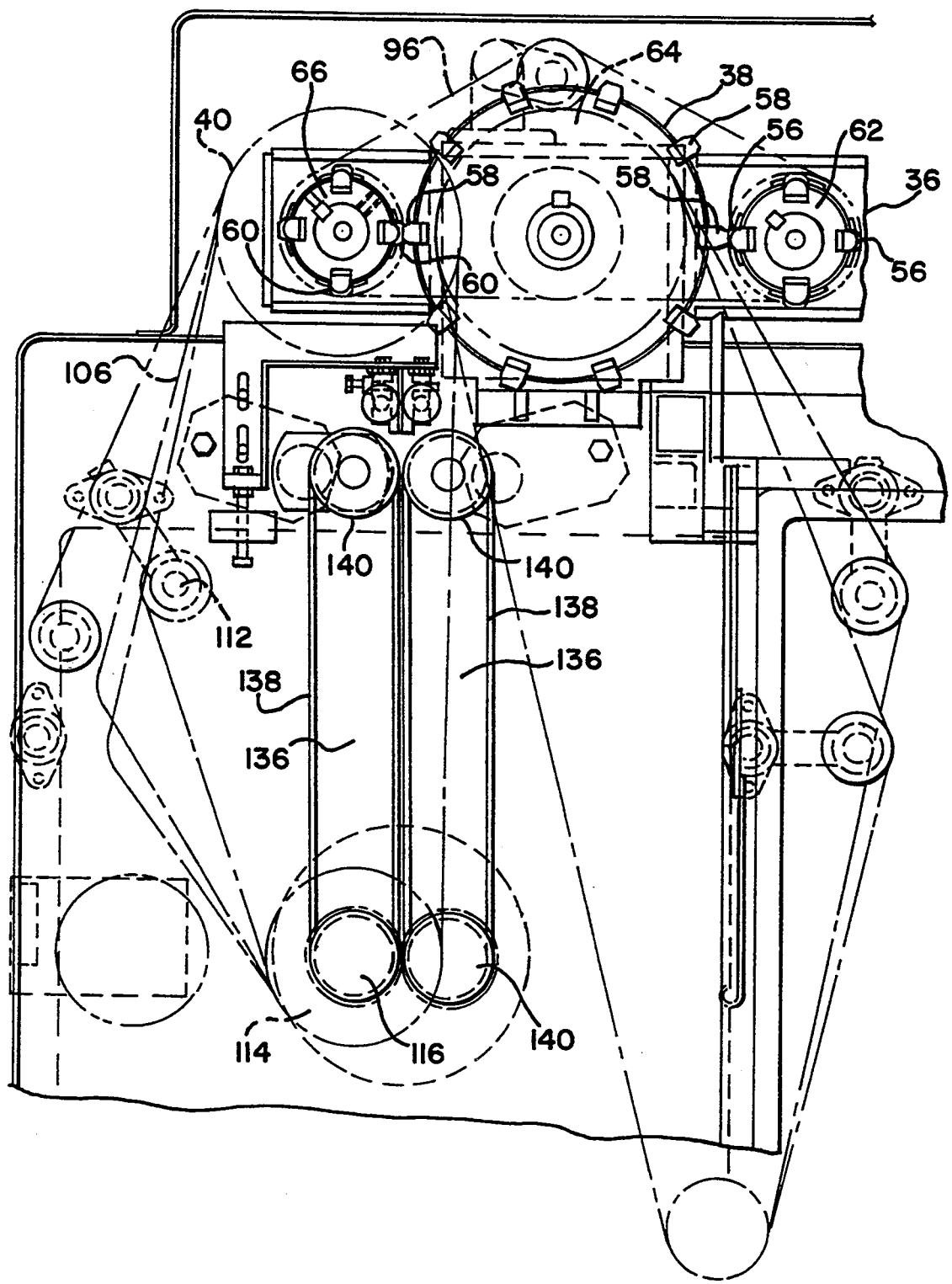
FIG. 6 is a front view of the crimp/sealing device of the embodiment of FIG. 1.

In order to synchronize the movement of the registration, heating, and sealing cylinders a system of pulleys, belts, and motors is employed at the rear portion of the apparatus as seen in FIGS. 6-8. Beginning with the sealing cylinder 66, the rear end of the rotating shaft 100 of the sealing cylinder comprises a pulley 104 and a cog 110 located inwardly of the pulley 104 and having teeth. Driving belt 106 engages pulley 104, tensioning pulley 112, and driving pulley 114. Driving pulley 114 is attached to an axle which includes an inward pulley 116. The axle is rotated by a belt 118 attached to a second inward pulley 120 and a pulley 122 which is rotated by a motor 124. The motor 124 preferably comprises a 5 HP AC motor known as a 184 TC Nema C-Face motor. Such a motor preferably produces 1525 rpm. This translates to a production rate of about 600 slices/minute. Also the motor 124 is preferably connected to a 10:1 reducer 126 which is connected to the axle.

Another pulley 128 is attached to the axle which rotates pulley 122. A timing belt 74 with teeth is attached to pulley 128, a tensioning pulley 132, and the pulley 72 attached to the shaft 68 of the heating cylinder 64. Thus, rotation of the pulley 128 results in rotation of the heating cylinder 64.

Synchronous rotation of the sealing cylinder 66 is accomplished by having a belt engage the pulley of the sealing station and be driven by a pulley of the registration station cylinder in a manner well known in the art.

THE CUTTING AND STACKING ARRANGEMENT

After the heat tack cross-seals have been formed, the web is then conveyed to a cutting station 42 and stacking station 44. The web so formed is first passed through a photo eye assembly 134 where the cross-seals are detected by an optical fiber photocell. The web then passes through tensioning means 136 which comprises two opposing looped belts 138 wherein each belt is driven by pulleys 140 in a manner well-known in the art. The web is then fed to the cutting station 42 and stacking station 44 (FIG. 1). A suitable cutting assembly for polypropylene comprises knives available as Model No. 280004 available from Do Boy Packaging Machinery, Inc. of New Richmond, Wisconsin. The knives cut the slices by engaging the heat tack seals and pressing the seals against an anvil made of hardened steel. The slices are cut by the pinching action of the knives against the anvil.

A suitable cutting and stacking station assembly for Mylar is available from Green Bay Machine Corporation (Green Bay, Wisconsin) as assembly No. E0-16-2-68 which is similar to those presently sold as the Green Bay Machine Corporation's Model 300S extruder. The cutting station 42 includes a cutting knife (not shown) and an electronic resolver (not shown) to detect the position of the knife. The electronic resolver is connected to a programmable limit switch used to determine the position of the cutting knife. Using the signal from the optical fiber photocell the position of the cutting knife is adjusted so that the knife cuts the web at the heat tack cross-seals.

be aligned with each other along line A denoted by dashed lines in FIGS. 2 and 3. Thus, when the web is conveyed between the registration and heating stations 36 and 38, cleats 56 and 58 will intermittently be aligned with each other with the web therebetween. Cleats 56 and 58 are aligned with each other for approximately 0.01 seconds and registration cylinder 62 is rotating at approximately 70 revolutions per minute. When cleats 56 and 58 are aligned they are compressed by approximately 0.035". Once aligned, the pressure and heat present are such as to produce a heat tack seal along a registration line in the web.

Upon having the registration lines of a slice formed, the slice then lays and rides on the heating cylinder 64 in the space provided between two consecutive cleats 58 with the registration line lying on the cleats 58. In one exemplary embodiment, the heating cylinder 64 rotates at an angular speed of approximately 60 revolutions per minute. The registration line lays on the heated cleat for approximately ½ seconds, and preferably 0.43 seconds at a web speed of approximately 700 slices per minute. This is in direct contrast to the short dwell time of 0.01 seconds used in the devices discussed previously. The registration line is heated by the surface of the cleat 58 while lying thereupon, i.e. during the dwell time. The heating of the registration line by the heating cylinder 64 provides an intermediate step to prepare the slice or web material for the forming of the heat tack cross-seals along the registration lines. It will be recognized by those skilled in the art that the temperatures needed will vary depending on the dwell time of the web on the cleats 58 and on the surface between the cleats.

The slice rotates 180° with the heating cylinder 64 until it is delivered to the sealing station 40 where for a second time pressure is applied with cleats 58 and 60 to form a heat tack seal along the registration lines. The heat tack seal formed by cleats 58 and 60 is structurally more sound than that formed by cleats 56 and 58 since pressure is now applied after the web material has dwelled on the heated cleats 58.

Sealing station 40 preferably comprises a sealing cylinder 66 identical in structure to that of the registration cylinder 62. The axes of the registration, heating, and sealing cylinders are parallel to one another and intersect line A. The sealing cylinder 66 and the heating cylinder 64 each rotate about their respective axis by a driving mechanism to be discussed below. The locations of cleats 58 and 60 are arranged such that upon simultaneous rotation of the registration and heating cylinder's corresponding cleats 58 and 60 will be aligned with each other along line A. Thus, when the web is conveyed between the heating and sealing stations 38 and 40, cleats 58 and 60 will intermittently be aligned with each other with the web therebetween. Cleats 58 and 60 are aligned with each other for approximately 0.01 seconds and sealing cylinder 66 is rotating at approximately 70 revolutions per minute. When cleats 58 and 60 are aligned they are compressed by approximately 0.035". Once aligned, the pressure and heat present are such as to produce a heat tack seal that separates cheese from either side of the seal. Since the web has been heated at the registration line during the dwell time, the web material is partially melted and thus a better seal is formed than prior art systems where the heating occurs only during contact between opposing cleats. Thus, a cheese slice is defined between two consecutive heat tack seals.

Preferably, the seal is formed such that when after the seal has been made and the package is pulled apart at the seal, the seal will break. This is opposed to the seals which are presently made where the seal is broken by delamination, that is, by breaking the bond between the top non-sealing layer of and the inner or sealing layer of the sheet of the web. This preferred packaging arrangement is achieved by proper selection of the thermoplastic material. For example, one preferred material to be used for processed cheese with or without preservatives comprises a polypropylene layer coextruded with an EVA polyethylene sealant layer with an intermediate adhesive layer.

While a polypropylene layer coextruded with an EVA polyethylene sealant layer with an intermediate adhesive layer is the preferred packaging material for cheese, other materials can be used for packaging cheese with the present invention. One group of materials are manufactured by coextruding multiple layers as described previously. The materials can also comprise a Mylar film with a sealant layer or a polypropylene layer coextruded with an oxygen barrier layer with an intermediate heat activated adhesive layer. An oxygen barrier layer such as EVOH, Saran, etc. may be employed with meats and food products that do not contain food preservatives.

Another group of packaging materials contemplated to be used which comprise layers which are laminated to each other in a manner well-known in the prior art. These materials include 1) a polyester layer laminated to a heat activated sealant layer; 2) a metallized polyester layer laminated to a heat activated sealant layer; 3) a nylon layer laminated to a heat activated sealant layers 4) a cellophane layer laminated to a heat activated sealant layers 5) a polycarbonate layer laminated to a heat activated sealant layer; and 6) an acrylic nitrile layer laminated to a heat activated sealant layer.

Though the two groups of materials are to be used to package cheeses, they may also be used to package many foods such as 1) processed cheese with or without preservatives; 2) cheese blends; 3) pizza toppings; 4) cheese and meat blends; 5) cheese, meat, and condiments blends; 6) mayonnaise; 7) peanut butter; 8) ketchup; 9) bar-b-que sauce; and 10) cheese and eggs. The 10 groups of foods listed above may also be packaged by a propylene layer coextruded with a polyethylene sealant layer with an intermediate adhesive layer.

When polypropylene is the web material, the sealing temperature (the temperature to which the heated cleats 58 are raised to) is preferably between approximately 250° F. and 320° F. depending on the web speed. In another embodiment, the sealing temperature is between approximately 350° F. and 450° F. when Mylar is the web material. The pressure exerted between the opposing cleats on the registration station 36 and heating station 38 is such that intimate contact between the two layers of film is maintained so that substantially all of the cheese is removed from between the two layers of the thermoplastic web material in the cross-sealed areas. Thus, the cheese completely occupies the interior of the volume of space defined by the heat tack web.

Preferably, the sealing cross-section of the cleats 58 are such that the heat tack cross-seal between adjacent cheese slices is approximately ⅛". The cleats 58 are spaced such that the distance from the beginning of one slice to the beginning of the next slice (including the cross-seal sections) is approximately 3 13/16 inches from center to center.

After the web has been cut to form the individual slices, the slices are discharged from the cutting station 42 and disposed on the stacking station 44 which stacks the slices into three stacks.

Therefore, the packaging and stacking system of the present invention provide a means for packaging individual slices of cheese in heat tack seals at an efficient and rapid production rate. The sealing arrangement provided by the present invention provides a heat seal along the longitudinal face of the web. After the cheese is inserted in the tubular web, heat tack cross-seals are formed. This arrangement provides a package of cheese with heat tack seals which will have a substantially longer shelf life than the presently available sliced cheese products. Additionally, the longitudinal seal and the cross-seals are provided in a manner which permits continuous movement of the web without the intermittent action of some presently available sealing systems. The slice which is produced and packaged according to the present invention provides a preferred final packaged product.

Additionally, since polyethylene may be used as the sealing layer, the packaging material is easily released from the processed cheese. This may obviate the need for items such as a shear pump to process the cheese so as to have a less cohesive texture and provide a better release. Of course, a shear pump may be used if desired. Since the web is cooled before the cross-seals are formed, registration with the cutting station is simplified. The process and apparatus of the present invention also permit the packaging material to be made of polypropylene. This is particularly advantageous since polypropylene is less expensive than presently used materials such as MYLAR.

The foregoing description of the preferred embodiments of the present invention has been presented for purposes of illustration and description. The described embodiments are not intended to be exhaustive or to limit the invention to the precise form disclosed. Obviously many modifications and variations are possible in light of the above teachings. The embodiments which were described were chosen in order to best explain the principles of the invention and its practical applications. It is intended that the scope of the invention be defined by the following claims, including all equivalents.

We claim:

1. A food packing device for producing individually wrapped slices of a food item from a continuous flattened tube of wrapping material with the food item therein, the flattened tube having a front face and a rear face, the device comprising:
    a registration station for producing adjacent sections of said flattened tube separated from each other by registration lines, wherein each of said registration lines are formed by said registration station pressing the front face and rear face of the tube material along an area transverse to the length of the tube such that the food item is squeezed out of said area;
    a conveyor to transport said continuous tube of the food item;
    a heating station disposed downstream of the registration station to heat said adjacent sections of said food item from said registration station at said registration lines for a predetermined time and wherein said registration lines are not pressed during said predetermined time; and
    a sealing station to receive said adjacent sections of said food item from said heating station and to heat said registration lines to form a tack seal at said registration lines.

2. The food packaging device of claim 1, wherein said heating station comprises a plurality of cleats mounted on a rotatable cylinder.

3. The food packaging device of claim 2, wherein said plurality of cleats are arranged circumferentially and equidistant from each other.

4. The food packaging device of claim 3, wherein adjacent ones of said plurality of cleats are separated from each other a predetermined distance which defines the length of a slice.

5. The food packaging device of claim 1, wherein said heating station generates a temperature of approximately between 250° F. and 320° F.

6. The food packaging device of claim 5, wherein said predetermined time is approximately ½ seconds.

7. The food packaging device of claim 1, wherein said heating station generates a temperature of approximately between 350° F. and 450° F.

8. The food packaging device of claim 1, wherein said heating station comprises a plurality of cleats.

9. A food packaging device for producing individually wrapped slices of a food item from a continuous flattened tube of wrapping material with the food item therein, the flattened tube having a front face and a rear face, the device comprising:
    a registration station comprising a cleat aligned with one of a plurality of cleats of a heating station so as to form a registration line when said food item is positioned therebetween and for producing adjacent sections of said flattened tube separated from each other by registration lines, wherein each of said registration lines is formed by said registration station pressing the front face and rear face of the tube material along an area transverse to the length of the tube such that the food item is squeezed out of said area;
    a conveyor to transport said continuous tube of the food item;
    said heating station comprising a plurality of cleats mounted on a rotatable cylinder and disposed downstream of the registration station to heat said adjacent sections of said food item from said registration station at said registration lines for a predetermined time; and
    a sealing station to receive said adjacent sections of said food item from said heating station and to heat said registration lines to form a tack seal at said registration lines.

10. The food packaging device of claim 9, wherein said registration station comprises a plurality of cleats mounted on a rotatable cylinder.

11. The food packaging device of claim 10, wherein said sealing station comprises a rotatable cylinder wherein the rotatable cylinders of said registration station and said sealing station have the same diameters.

12. The food packaging device of claim 11, wherein the diameters of the rotatable cylinders of said registration station and sealing station are different in value than the diameter of the rotatable cylinder of said heating station.

13. The food packaging device of claim 11, wherein said plurality of cleats of said heating station are equally spaced and are supported on a surface, wherein the surface lies between adjacent cleats and supports a section of said food item.

14. The food packaging device of claim 10, comprising a synchronizing device to align at least one of said plurality of cleats mounted on the registration station and at least one of said plurality of cleats mounted on the heating station.

15. A foot packaging device for producing individually wrapped slices of a food item from a continuous flattened tube of wrapping material with the food item therein, the flattened tube having a front face and a rear face, the device comprising:
- a registration station for producing adjacent sections of said flattened tube separated from each other by registration lines, wherein each of said registration lines are formed by said registration station pressing the front face and rear face of the tube material along an area transverse to the length of the tube such that the food item is squeezed out of said area;
- a conveyor to transport said continuous tube of the food item;
- a heating station comprising a plurality of cleats mounted on a rotatable cylinder and disposed downstream of the registration station to heat said adjacent sections of said food item from said registration station at said registration lines for a predetermined time; and
- a sealing station comprising a cleat aligned with one of said plurality of cleats of said heating station so as to press the front face and rear face of the tube material together to form a seal when said registration line is aligned with said aligned cleats and to receive said adjacent sections of said food item from said heating station and to heat said registration lines to form a tack seal at said registration lines.

16. The food packaging device of claim 15, wherein said sealing station comprises a plurality of cleats mounted on a rotatable cylinder.

17. The food packaging device of claim 16, wherein said registration station comprises a cleat aligned with one of said plurality of cleats of said heating station so as to form said registration line when said food item is positioned therebetween.

18. A food packaging device for producing individually wrapped slices of a food item from a continuous flattened tube of wrapping material with the food item therein, the flattened tube having a front face and a rear face, the device comprising:
- a registration station for producing adjacent sections of said flattened tube separated from each other by registration lines, wherein each of said registration lines are formed by said registration station pressing the front face and rear face of the tube material along an area transverse to the length of the tube such that the food item is squeezed out of said area;
- a conveyor to transport said continuous tube of the food item;
- a heating station comprising a plurality of cleats mounted on a rotatable cylinder and disposed downstream of the registration station to heat said adjacent sections of said food item from said registration station at said registration lines for a predetermined time; and
- a sealing station comprising a cleat aligned with one of said plurality of cleats of said heating station so as to press together the front and rear faces of the tube material to form a seal when said registration line is aligned with said aligned cleats and to receive said adjacent sections of said food item from said heating station and to heat said registration lines to form a tack seal at said registration lines.

19. The food packaging device of claim 18, wherein said sealing station comprises a plurality of cleats mounted on a rotatable cylinder.

20. The food packaging device of claim 19, wherein said synchronizing device aligns at least one of said plurality of cleats mounted on the heating station with at least one of said plurality of cleats mounted on the sealing station.

21. A method of producing individually wrapped slices of a food item from a continuous flattened tube of wrapping material with the food item therein comprising the steps of:
- pressing said tube along a first area transverse to the length of the tube such that the food item is squeezed out of said first area so as to form a first registration line;
- pressing said tube along a second area transverse to the length of the tube such that the food item is squeezed out of said second area so as to form a second registration line and define a food item slice located between said first and second registration lines;
- discontinuing said pressing of said tube and heating said first and second registration lines for a predetermined amount of time;
- after the heating of the first and second registration lines, pressing said heated first and second registration lines so as to form a food item slice with a tack seal.

22. The method of claim 21, wherein said food item is a cheese product.

23. The method of claim 22, wherein said heating step is performed at a temperature of between approximately 250° F. and 320° F.

24. The method of claim 23, wherein said predetermined time is approximately ½ seconds.

25. The method of claim 22, wherein said heating step is performed at a temperature of between approximately 350° F. and 450° F.

26. The method of claim 21, comprising cutting said food item slice with said tack seal along said first and second registration lines.

27. An individually wrapped slice of a food item formed from a continuous flattened tube of wrapping material with the food item therein formed by the steps of:
- pressing said tube along a first area transverse to the length of the tube such that the food item is squeezed out of said first area so as to form a first registration line;
- pressing said tube along a second area transverse to the length of the tube such that the food item is squeezed out of said second area so as to form a second registration line and define a food item slice located between said first and second registration lines;
- discontinuing said pressing of said tube along said first and second areas transverse to the length of the tube and heating said first and second registration lines for a predetermined amount of time;
- pressing said heated first and second registration lines so as to form a food item slice with a tack seal.

28. The food item slice of claim 27, wherein said heating step is performed at a temperature of between approximately 250° F. and 320° F.

29. The food item slice of claim 28, wherein said predetermined time is approximately 178 seconds.

30. The food item slice of claim 27, wherein said food item is a cheese product.

31. The food item slice of claim 27, wherein said heating step is performed at a temperature of between approximately 350° F. and 450° F.

32. The food item slice of claim 27, comprising the step of cutting said food item slice with a tack seal along said first and second registration lines.

33. The food packaging device of claim 1, wherein said wrapping material comprises a stretchable material.

34. The food packaging device of claim 33, wherein said wrapping material comprises polypropylene.

35. The method of claim 21, wherein said wrapping material comprises a stretchable material.

36. The method of claim 35, wherein said wrapping material comprises polypropylene.

37. The food item slice of claim 27, wherein said wrapping material comprises a stretchable material.

38. The food item slice of claim 37, wherein said wrapping material comprises polypropylene.

* * * * *

UNITED STATES PATENT AND TRADEMARK OFFICE
CERTIFICATE OF CORRECTION

PATENT NO. : 5,347,792
DATED : September 20, 1994
INVENTOR(S) : Vincent A. Meli et al.        Page 1 of 3

It is certified that error appears in the above-indentified patent and that said Letters Patent is hereby corrected as shown below:

On the Title Page

In column 1, line 1 under "References Cited U.S. PATENT DOCUMENTS", delete "2/1922" and substitute --7/1925--.

On Page 2 of the title page, column 1, line 11, delete "Harmia" and substitute --Harima--.

On Page 2 of the title page, column 1, line 13, delete "4,106,245" and substitute --4,106,265--.

On Page 2 of the title page, column 1, line 20, delete "12/1981" and substitute --1/1984--.

In column 1, line 31, delete "Joined" and substitute --joined--.

In column 2, line 26, delete "Kusther" and substitute --Kustner--.

In column 3, lines 10-11, delete "crimp-/sealing" and substitute --crimp/sealing--.

UNITED STATES PATENT AND TRADEMARK OFFICE
CERTIFICATE OF CORRECTION

PATENT NO. : 5,347,792
DATED : September 20, 1994
INVENTOR(S) : Vincent A. Meli et al.

It is certified that error appears in the above-indentified patent and that said Letters Patent is hereby corrected as shown below:

In column 7, line 48, delete "ks" and substitute --is--.

In column 7, line 53, delete "An" and substitute --in--.

In column 7, line 55, delete "An" and substitute --in--.

In column 8, line 8, delete "Jaws" and substitute --jaws--.

In column 8, line 10, after "38" insert --are--.

In column 8, line 27, delete "Warlow" and substitute --Watlow--.

In column 8, line 64, after "by" insert --a--.

In column 10, line 28, delete the first occurrence of "which".

In column 10, line 33, delete "layers" and substitute --layer.--

In column 10, line 35, delete "layers" and substitute --layer.--

UNITED STATES PATENT AND TRADEMARK OFFICE
CERTIFICATE OF CORRECTION

PATENT NO. : 5,347,792
DATED : September 20, 1994
INVENTOR(S) : Vincent A. Meli et al.

It is certified that error appears in the above-indentified patent and that said Letters Patent is hereby corrected as shown below:

In column 12, line 1, delete "As" and substitute --is--.

Column 17,

In claim 29, line 2, delete "178" and substitute --½--.

Signed and Sealed this

Seventh Day of November, 1995

Attest:

BRUCE LEHMAN

*Attesting Officer*     *Commissioner of Patents and Trademarks*